United States Patent [19]

O'Donnell et al.

[11] Patent Number: 6,163,801

[45] Date of Patent: Dec. 19, 2000

[54] DYNAMIC COMMUNICATION BETWEEN COMPUTER PROCESSES

[75] Inventors: Michael D. O'Donnell; Danny B. Gross, both of Austin; Gene R. Toomey, Kyle, all of Tex.

[73] Assignee: Advanced Micro Devices, Inc., Sunnyvale, Calif.

[21] Appl. No.: 09/182,921

[22] Filed: Oct. 30, 1998

[51] Int. Cl.$^7$ .................................................. G06F 13/00

[52] U.S. Cl. ..................... 709/213; 709/215; 709/312; 709/400; 711/141; 711/147

[58] Field of Search ...................................... 709/201, 213, 709/214, 215, 102, 106, 312, 400; 711/147, 148, 141

[56] References Cited

U.S. PATENT DOCUMENTS

| | | | |
|---|---|---|---|
| 5,394,555 | 2/1995 | Hunter et al. ............................. | 711/148 |
| 5,608,893 | 3/1997 | Slingwine et al. ...................... | 711/141 |
| 5,958,019 | 9/1999 | Hagersten et al. ...................... | 709/400 |
| 6,049,853 | 4/2000 | Kingsbury et al. ..................... | 711/147 |
| 6,092,155 | 7/2000 | Olnowich ................................ | 711/142 |

OTHER PUBLICATIONS

Consilium, WorkStream DFS/A Brochure, Feb., 1993 (6 pages).

"Semiconductor Automation and the Role of WorkStream DFS/A," Consilium publication, Sep. 1993 (14 pages).

*Primary Examiner*—Viet D. Vu
*Attorney, Agent, or Firm*—Skjerven Morrill MacPherson, LLP; Stephen A. Terrile

[57] ABSTRACT

A method of communication in a distributed computing environment includes storing information in a first memory segment on a first computer system in the distributed computing environment. A second memory segment of a second computer system is repeatedly updated. The second memory segment is repeatedly updated with information corresponding to the most recently read information stored in the first memory segment. The information stored in the second memory segment is repeatedly read by each of a plurality of work session computer processes. The information stored in the first memory segment is changed. A function is performed by each of the plurality of work session computer processes. The function performed by each of the plurality of work session computer processes is determined by a change of the information read from the second memory segment.

19 Claims, 5 Drawing Sheets

DYNAMIC COMMUNICATION BETWEEN COMPUTER PROCESSES

BACKGROUND

1. Field of the Invention

The present invention relates to computer systems and networks of computer systems, and, more particularly, to interprocess communication between otherwise autonomous computer processes executing on a distributed computer system and network thereof.

2. Description of the Related Art

Computer systems are information processing systems which can be designed to give independent computing power to one user or a plurality of users. Computer systems may be found in many forms including, for example, mainframes, minicomputers, workstations, servers, personal computers, and embedded systems. A typical computer system includes at least one processing unit, associated memory and a number of input/output (I/O) devices. In addition to other purposes, computer systems are used to track and control manufacturing processes such as semiconductor manufacturing processes and systems.

A computer system processes information according to a program and produces resultant output information via the I/O devices. A program is a list of internally stored instructions such as a particular application program and/or an operating system. A computer process typically includes an executing (running) program or portion of a program, current program values and state information, and the resources used by the operating system to manage the execution of the process. A process may spawn other processes. A process which spawns other processes is a parent process, and the spawned processes are child processes of the parent process. A function described as being performed by a parent process is sometimes actually performed by a child process spawned by the parent process to perform the function. An application or work session includes an application/work process and any processes spawned by the application/work process.

A computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

Computer systems are often coupled to other computer systems to form a network to facilitate the exchange and handling of information. A computer network typically includes a group of computer systems and associated hardware devices (e.g., physical connections) and software applications (e.g., communications protocol programs and data). A computer network may include multiple computer processes executing on several computer systems as a distributed multiprocessing platform in which the several computer systems are accessible by each of the computer processes. Additionally, multiple computer processes executing on the same computer system often communicate with each other in a similar fashion as multiple computer processes executing on different computer systems. Consequently, it often makes sense to discuss interaction between computer processes instead of, or in addition to, interaction between computer systems.

Computer processes often need to coordinate their activities. Conceptually, this coordination is implemented via some form of passive or active communication between computer processes. Such communication is typically referred to as interprocess communication (IPC). Some basic IPC techniques include the following: locking files or records to indicate that an alternately shared resource is being used, and sending signals by one process to another process. These IPC techniques are somewhat limited in scope and suffer from a lack of reliable synchronization. Other IPC techniques include the use of pipes, message queues, semaphores, remote procedure calls and sockets.

Shared memory is an IPC technique which provides a shared data space that is accessed by multiple computer processes and may be used in combination with semaphores. Shared memory allows multiple processes to share virtual memory space. Shared memory provides a quick but sometimes complex method for processes to communicate with one another. In general, one process creates/allocates the shared memory segment. The size and access permissions for the segment are set when the segment is created. The process then attaches the shared segment, causing the shared segment to be mapped into the current data space of the process. (The actual mapping of the segment to virtual address space is dependent upon the memory management hardware for the system.) If necessary, the creating process then initializes the shared memory. Once created, other processes can gain access to the shared memory segment. Each process maps the shared memory segment into its data space. Each process accesses the shared memory relative to an attachment address. While the data that these processes are referencing is in common, each process will use different attachment address values. Semaphores are often used to coordinate access to a shared memory segment. When a process is finished with the shared memory segment, the process can detach from the segment. The creator of the segment may grant ownership of the segment to another process. When all processes are finished with the shared memory segment, the process that created the segment is usually responsible for removing the segment.

Computer systems are often used to provide general manufacturing monitoring and control. For example, a semiconductor manufacturing computer system is a computer system for providing information, control and/or automation to semiconductor manufacturing tools and/or systems in a semiconductor manufacturing facility. For example, one semiconductor manufacturing system is the WorkStream Distributed Factory System (WorkStream DFS), WorkStream DFS\A™ or other variants (hereinafter, WorkStream) which are available from Consilium, Inc. of Mountain View, Calif.

Figure 5A:
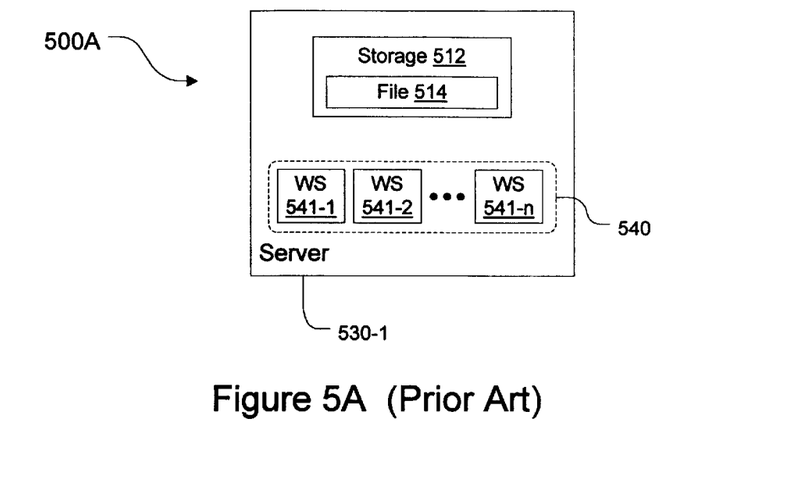
FIG. 5A, labeled prior art, shows a block diagram of a prior art computer system.

Referring to FIG. 5A, WorkStream is typically implemented via a single server. For example, a WorkStream user may initiate a WorkStream application session (hereinafter, work session) on a server computer system 530-1 from one of several client computer systems or terminals (not shown) which are coupled to server computer system 530-1. In such an environment, communication between system managers and work session users is fairly simple as the number and whereabouts of each work session user is known and each work session user is easily contacted.

Figure 5B:
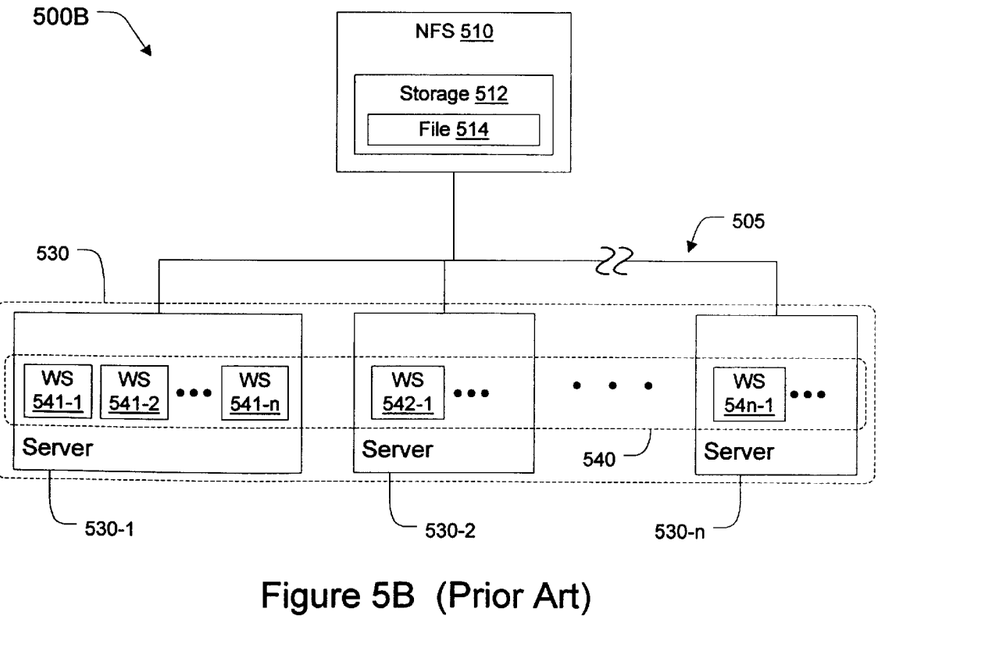
FIG. 5B, labeled prior art, shows a block diagram of a prior art distributed computing system.

Referring to FIG. 5B, labeled prior art, when a large number of instances of WorkStream applications are implemented over multiple server systems 530, communication between the system managers and work session users becomes complicated. After a work session user initiates a work session (e.g., one of work sessions 540), there is limited ability to dynamically communicate information to that work session and the user thereof. When a work session user is engaged in a work session, a system manager often has a difficult time communicating with the work session user or the work session via a system management computer process. As the number of instances of work sessions increases and the locations of work sessions become more distributed, communication between system managers and work session users can become increasingly difficult. For example, if five or more servers 530 were used to support 500 or more work sessions 540 distributed over a large computer network in a semiconductor fabrication facility, the ability to dynamically communicate information to each of the 500 or more work sessions or users thereof would become commensurably more difficult.

Referring to FIGS. 5A and 5B, a system manager may communicate with a work session user via a system management process which stores a value in file 514 of storage 512. Each of work sessions 540, repeatedly reads file 514 to determine if the value stored in file 514 has changed from an initial value. In system 500A of FIG. 5A, these reads occur rather quickly as they are performed within server 530-1. In system 500B of FIG. 5B, these reads can take longer to perform as they are performed over network coupling 505 which is typically much slower than the internal couplings of computer system 530-1. Furthermore, such reads consume bandwidth of network coupling 505. Because the number of such reads can occur quite frequently (e.g., upon every screen transaction) for each work session, and because the number work sessions can become quite large, network coupling 505 can lose significant bandwidth as a result, and other important network communications are degraded thereby.

SUMMARY

It has been discovered that by copying a shared memory segment from a primary server to various secondary servers in a distributed computing environment (e.g., in a semiconductor manufacturing control environment), a management process may dynamically communicate with multiple work sessions, user interface manager applications, etc. For example, a management process or processes can update information from a shared memory segment on a primary server to a shared memory segment on each of various secondary servers in a multiple server, multiple work session semiconductor manufacturing environment. A management process can then alter the information stored in the shared memory segment of the primary server. Management processes on each secondary server check the shared memory segment of the primary server for updates. If an update to the shared memory segment of the primary server, each management process correspondingly updates the shared memory segment on the respective secondary server. Each work session repeatedly reads at least a portion of the shared memory segment on its respective secondary server and executes a predetermined function when corresponding predetermined information or change thereto is read from the shared memory segment on the secondary server of the work session. The information stored in the memory segment may include integers or other values that indicate if a change has been made to the memory segment since the most recent read, and may include a command or a file location where a command may be found. The command may then be executed.

In one exemplary embodiment, a method of communication in a distributed computing environment includes storing information in a first memory segment on a first computer system in the distributed computing environment. A second memory segment of a second computer system is repeatedly updated. The second memory segment is repeatedly updated with information corresponding to the most recently read information stored in the first memory segment. The information stored in the second memory segment is repeatedly read by each of a plurality of work session computer processes. The information stored in the first memory segment is changed. A function is performed by each of the plurality of work session computer processes. The function performed by each of the plurality of work session computer processes is determined by a change of the information read from the second memory segment.

In another exemplary embodiment, a method of interprocess communication is provided in a WorkStream semiconductor manufacturing distributed computing environment including multiple instances of active WorkStream processes. Each WorkStream process executes a programmable screen transaction completion function. The method includes the following: initializing a first memory segment on a first semiconductor manufacturing server in the WorkStream semiconductor manufacturing distributed computing environment; initializing a second memory segment on a second semiconductor manufacturing server in the WorkStream semiconductor manufacturing distributed computing environment; attaching the first memory segments by a first management computer process executing on the first semiconductor manufacturing server; attaching the first and second memory segments by a second management computer process executing on the second semiconductor manufacturing server; attaching a plurality of WorkStream processes executing on the second semiconductor manufacturing server to the second memory segment; storing information in the first memory segment with the first management computer process after attaching the first management computer process to the memory segment; mirroring the information from the first memory segment to the second memory segment by the second management computer process after attaching the second management computer process to the first and second memory segments; repeatedly reading the information stored in the second memory segment by each of the plurality of WorkStream processes after attaching the plurality of WorkStream processes to the second memory segment; and performing a function with each of the plurality of WorkStream processes if the information read from the second memory segment by each of the WorkStream processes has a first value.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following description is intended to provide a detailed description of an example of the invention and should not be taken to be limiting of the invention itself. Rather, any number of variations may fall within the scope of the invention which is defined in the claims following the description.

In one embodiment of the invention, a distributed computing system includes a network file system (NFS) server coupled to various compute servers via a network coupling. A master management process executes on the NFS server, and a compute server management process and various work sessions execute on each of the compute servers. Each of the NFS server and the compute servers includes a memory segment to facilitate communication between the master management process and the work sessions.

A master management process on the NFS server stores values in a master memory segment. Each of the compute server management processes initializes a corresponding compute server memory segment with a copy of the contents of the master memory segment. Each compute server management process periodically accesses the master memory segment to check for any updates to the master memory segment. If the master memory segment has been updated, each compute server memory segment is updated by the respective compute server management process.

The work sessions are configured to check a memory segment upon the completion of each of various screen based transactions which may occur quite frequently. Each work session reads the compute server memory segment to determine if an update to the memory segment has occurred. If an update has occurred, a predefined or programmable function is performed by the work session.

Thus, repeated access of the master memory segment by the possibly numerous work sessions upon the completion of each of the possibly numerous screen based transactions is avoided. The resulting degradation of network communications in the distributed computing system is thereby avoided. In this way, the master management process can communicate with each work session without overloading the network coupling because only the management process of each compute server, rather than each work session, reads the master memory segment. Also, each compute server management process reads the master shared memory less frequently than the rate of completion of screen based transactions of each work session, thereby further decreasing the degradation of network performance which resulted from prior art work session communication techniques. If, for example, the distributed computing system includes 1000 work sessions executing a screen based transaction at a first rate on 10 compute servers, the master shared memory segment is read by each of 10 compute server management processes at a second rate which is less than the first rate.

Thus, a shared memory segment is accessed by a work session to read message information (e.g., the value stored in the memory segment) and execute predetermined functions based on the content of the message information if the message information has been changed since the last read of the message information by the work session. Multiple shared memory segments may be provided on corresponding multiple server computer systems. Such a configuration advantageously provides to system managers of large semiconductor manufacturing facilities, for example, the ability to communicate with multiple and possibly remote instances of work sessions. The system manager initiates management processes to store message information in selected shared memory segments to communicate message information to each of several work sessions and possibly the users thereof. Thus, the prior limited ability to communicate information to such work sessions is overcome.

More specifically, a compute server shared memory segment or region is initialized and attached by a compute server management process in a semiconductor processing system. Multiple shared memory segments may be defined in accordance with the invention. Various work sessions on the compute server also attach the compute server memory segment so that the work sessions may access the memory segment. The work sessions execute a set of functions each time a system event occurs such as an I/O event (e.g., entering a command or keystroke, or completing a screen based transaction). One of the functions executed is a read of the compute server memory segment to check for changes to the memory segment. The compute server management process changes the information or values stored in the compute server memory segment responsive to certain system or network events or system manager inputs which first cause a change to a file server and/or commonly accessible memory segment. The work sessions perform predetermined functions when corresponding predetermined values or changes are read from the compute server memory segment. Such predetermined functions may include display of a message or messages, self-termination by the work session, etc. In this way, a system manager can dynamically communicate with the otherwise autonomous work sessions.

Figure 1A:
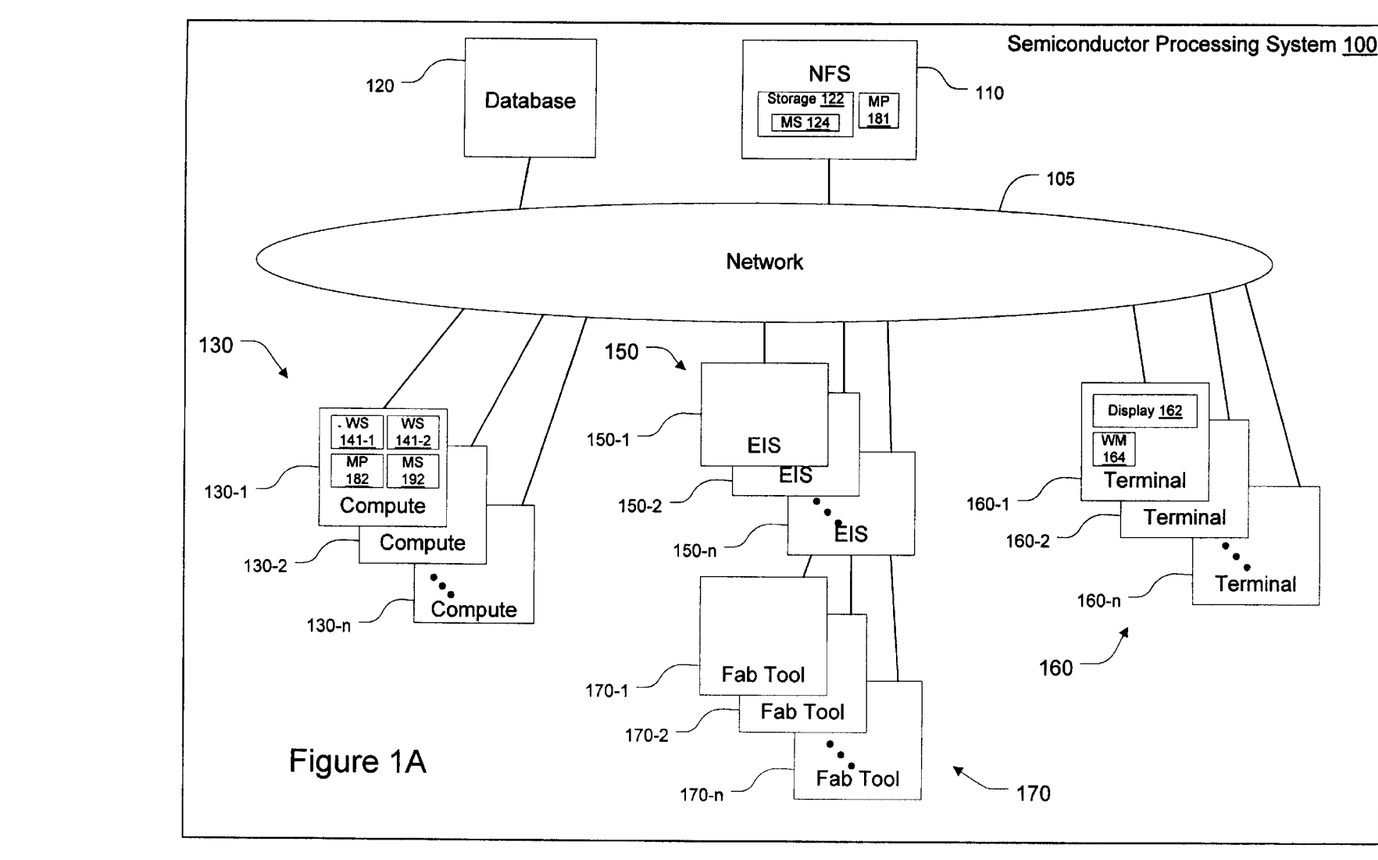
FIG. 1A shows a block diagram of an embodiment of a distributed computing system according to the invention.

Referring to FIG. 1A, a distributed computing system 100 such as a semiconductor processing system includes various computer systems which are coupled via network coupling 105 to execute various subtasks of system 100. For example, system 100 includes NFS server 110, database server 120, compute servers 130, equipment interface servers 150, and terminals 160. Network 105 may be an Ethernet coupling, a fiber distributed data interface (FDDI) coupling, or any other expedient for coupling the computer systems of system 100. Compute servers 130 include at least one compute server such as compute servers 130-1, 130-2 and 130-n. Equipment interface servers 150 include at least one equipment interface server (EIS) such as EIS 150-1, EIS 150-2 and EIS 150-n. Terminals 160 include at least one terminal such as terminals 160-1, 160-2 and 160-n. System 100 further includes at least one fab tool coupled to the equipment interface servers 150. For example, fab tools 170 include tools 170-1, 170-2 and 170-n coupled to EIS 150-1. Fab tools 170 are coupled to EIS 150-n via any appropriate coupling such as a network, RS-232 standard connection, or any other appropriate expedient(s).

Database server 120 typically has high availability requirements and is accessible by multiple remote users of computer systems coupled within system 100. Computer systems such as database server 120 are often used to facilitate general manufacturing monitoring and control. For example, database server 120 provides information regarding semiconductor manufacturing tools (e.g., fab tools 170)

and facilitates control and/or automation of semiconductor manufacturing tools and/or systems by users in a semiconductor manufacturing facility or fab.

Figure 1B:
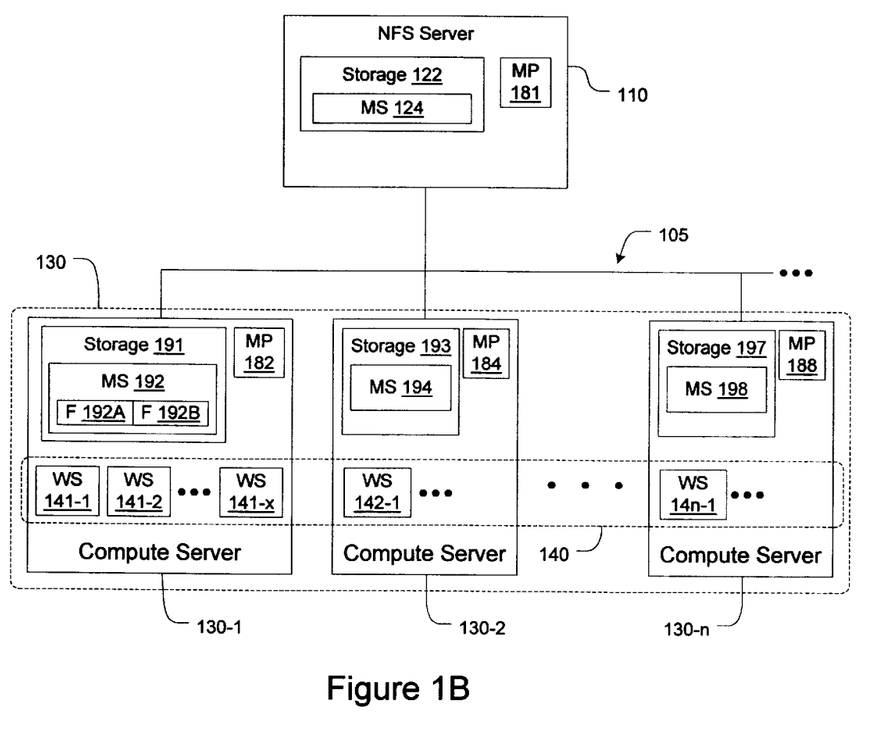
FIG. 1B shows a block diagram of a subset of the distributed computing system of FIG. 1A.

Referring to FIGS. 1A and 1B, NFS server 110 controls the file system of system 100. NFS server 110 includes storage 122 which includes master memory segment 124. NFS server 110 also includes master management process 181 for controlling the content of compute server memory segments. Master management process 181 may be a permanent or transient computer process.

Each of compute servers 130 includes storage for a memory segment for mirroring the content of master memory segment 181. For example, compute servers 130-1, 130-2 and 130-n include storage 191, 192 and 198 for memory segments 192, 194 and 198, respectively. Each of compute servers 130 also includes a compute server management process for controlling the content of the respective compute server memory segment. For example, compute servers 130-1, 130-2 and 130-n include compute server management processes 182, 184 and 188, respectively. Each of management processes 182, 184 and 188 may be a permanent or transient computer process and may be functionally decomposed into a plurality of management processes. For example, the functionality of management process 182 described herein may be decomposed into an initialization management process and a master memory segment check process.

Each of compute servers 130 also includes various work sessions. For example, compute server 130-1 includes work sessions 141-1, 141-2 . . . 141-x. Work sessions 141-1, 141-2 . . . 141-x facilitate control of the operation of one or more of fab tools 170. In operation, a terminal user initiates a semiconductor application work session on one of compute servers 130 from one of terminals 160. Thus, for example, work sessions 141-1, 141-2 . . . 141-x are initiated from terminal 160-1 and use computer resources of compute server 130-1. Each work session accesses a semiconductor processing database on database server 120 to read and write information regarding the operation of fab tools 170. Each work session provides control information to fab tools 170 via equipment interface servers 150 and returns status information to database server 120. For example, a user of terminal 160-1 initiates work session 141-1 on compute server 130-1 to control fab tool 170-1 and to receive and provide information regarding the operation of fab tool 170-1.

System 100 provides a semiconductor manufacturing and processing management system for managing information distribution, system control and automation of manufacturing processes in a semiconductor fabrication facility. System 100 operates using the WorkStream factory shop floor application which is available from Consilium, Inc. of Mountain View, Calif. WorkStream is used to drive the manufacturing functions within a semiconductor manufacturing facility or fab. WorkStream facilitates management of the execution of production plans for manufacturing operations by providing control of work instructions to users and by providing control of automated equipment. WorkStream also facilitates recording product genealogies and work conditions.

WorkStream users initiate WorkStream work sessions on compute servers 130 from terminals 160. Each WorkStream work session accesses database server 120 to read and write information to database 150 regarding the operation of fab tools 170. Each WorkStream work session provides control information to fab tools 170 via equipment interface servers 150 and returns status information to database server 120.

Up to ten and sometimes more compute servers 130 are coupled to network 105, and up to thirty and sometimes more terminals 160 are coupled to each of the compute servers 130 via network 105. Such a system 100 can support over 1000 work sessions initiated, for example, by users of terminals 160 and executed on compute servers 130 to control and provide information regarding the operation of fab tools 170. Thus, for example, more than 100 WorkStream work sessions may be executing on each of the compute servers 130 from the terminals 160 coupled thereto. In such a computing environment, the ability to communicate to the user of each work session becomes especially difficult.

Figure 2:
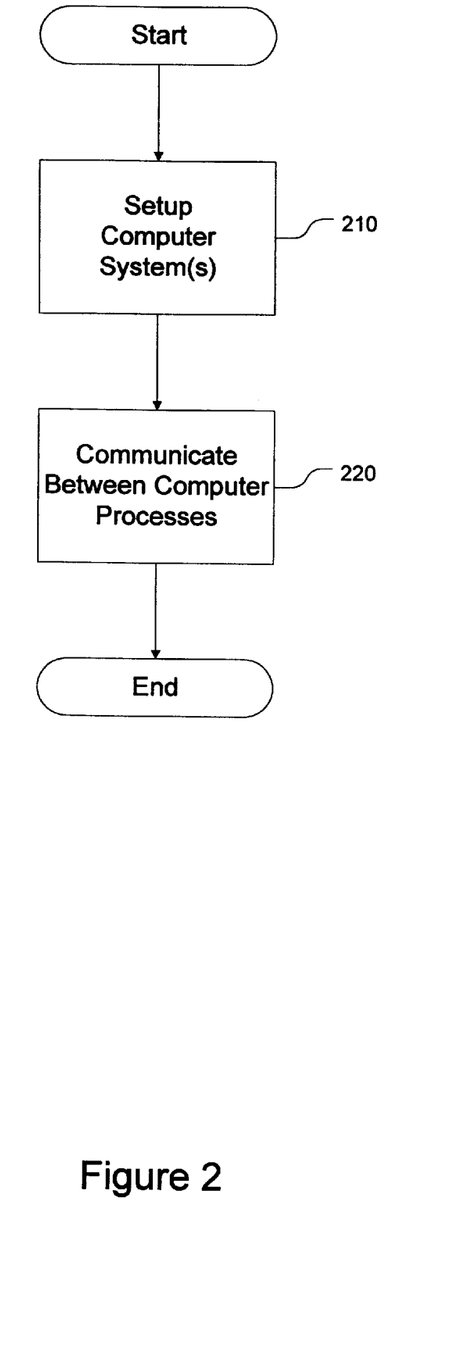
FIG. 2 shows a flow chart of an embodiment of a communication module and/or operation according to the invention.

FIG. 2 depicts a flow chart of an interprocess communication module and/or operation according to the invention. During setup operation 210, computer systems 110 120, 130, 140 and 160 are configured to execute in accordance with the invention. Setup operation 210 is further disclosed below and in FIG. 3. After the necessary setup operations are performed on system 100 during setup operation 210, control transitions to communicate operation 220. Communicate operation 220 is executed by management processes 181, 182, 184, 188 and various work sessions 140. Communicate operation 220 is further disclosed below and in FIG. 4. For simplicity, the operation of system 100 is often described with reference to the processes and memory segments of NFS server 110 and compute server 130-1. It will be understood that NFS server 110 and the processes and memory segment(s) thereof interact with other servers of system 100 in an analogous manner.

Figure 3:
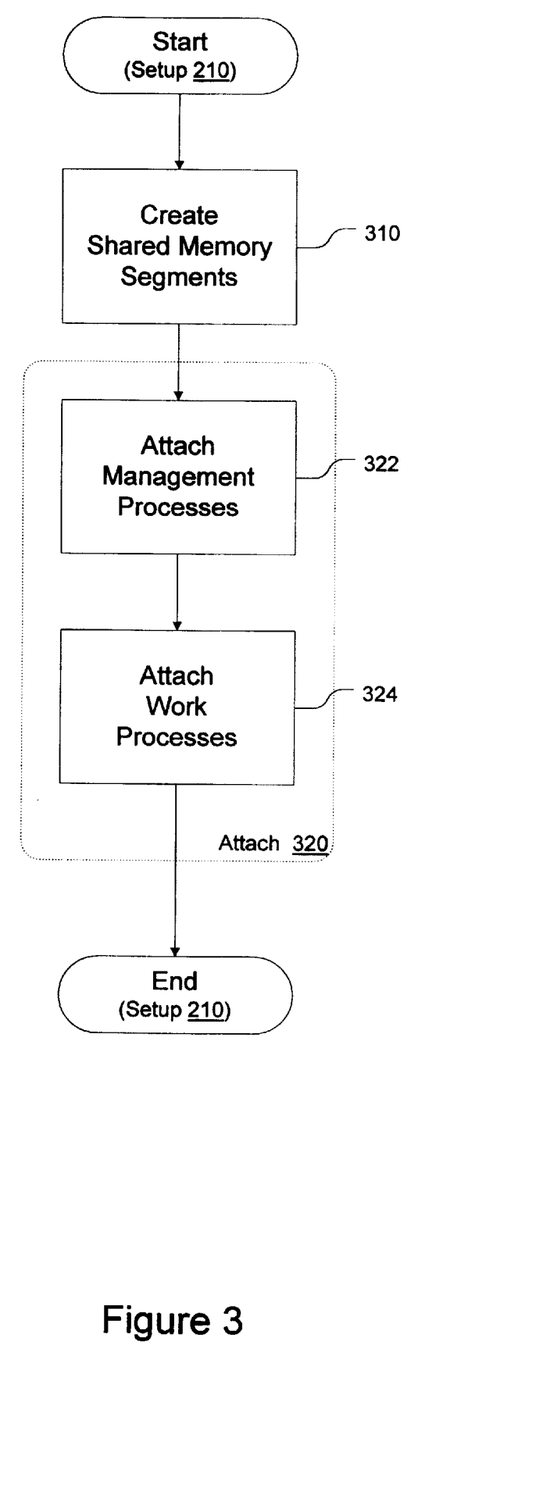
FIG. 3 shows a flow chart of an embodiment of a setup module and/or operation according to the invention.

During setup operation 210, master management process 181 creates/allocates memory segment 124 on NFS server 124. Master management process 181 controls access privileges to memory segment 124. Compute server management process 182 creates/allocates memory segment 192 on compute server 130-1 and controls access privileges to memory segment 192. Work sessions are initiated from terminals 160. Each work session is initiated by a user of one of terminals 160.

Each of memory segments 124, 192, 194, 198 may include memory segment fields for storing different types of information. For example, memory segment 192 includes memory segment fields 192A and 192B. Memory segment field 192A stores information to indicate to a reading process that another process is communicating with the reading process. For example, integer value or values may be stored in memory segment field 192A. If the integer value or values are incremented or otherwise changed, each work session reading memory segment field 192A is alerted to a communication from master management process 181. Memory segment field 192B stores information indicating a function to be performed if corresponding information in memory segment field 192A changes. For example, memory segment field 192B may store a file which includes a list of commands to be executed or a message to be displayed to a terminal user.

During communicate operation 220, master management process 181 manages the changes to the information stored in memory segment 124, and compute server management process 182 manages the changes to the information stored in memory segment 192. For example, master management process 181 increments an integer in memory segment 124 and stores a file location in memory segment 124. Compute server management process 182 periodically checks master memory segment 124 and updates compute server memory segment 192 if necessary. Thus, compute server management process 182 responsively increments an integer in memory segment field 192A and stores a file location in memory segment field 192B. Compute server management process 182 may be a permanent process that calls a first management function to initialize the shared memory segment 192 and that periodically, or on demand, calls a second management function to update compute server memory segment 192. Alternatively, master management process 181 writes to compute server memory segment 192 when a message is to be communicated to work sessions 141-1, 141-2 . . . 141-x. During operation, each work session 141-1, 141-2 . . . 141-x repeatedly checks and reads memory segment 192 upon each screen transaction and performs a predetermined function depending on a change to information stored in memory segment 192, if any.

Compute server memory segment 192 is frequently checked by work sessions 141-1, 141-2 . . . 141-x executing on compute server 130-1. Master memory segment 124 is checked less frequently than each compute server memory segment 182, 184, 188. Master memory segment 124 is checked by compute server management process 182 to ensure that pertinent values of master memory segment 124 are represented in compute server memory segment 192. The consumed bandwidth of network 105 due to memory segment checking is thereby reduced compared to the consumed bandwidth that would occur if all of work sessions 140 checked master memory segment 124 on the more frequent basis. Client processes such as work sessions and/or window manager processes perform frequent repeated read only functions on compute server memory segment 192 instead of on master memory segment 124.

An exemplary work session 141-1 is programmed to repeatedly read the information stored in memory segment 192 on compute server 130-1. Work session 141-1 initiated by terminal 160-1 on compute server 130-1 includes programmable code which is performed more than once during work session 141-1. For example, the programmable code may be executed upon completion of a WorkStream screen transaction. Such screen transactions occur repeatedly during the normal operation of a work session, and a read of memory segment 192 occurs upon the completion of each screen transaction. If the information stored in memory segment 192 has been changed in a predefined manner, work session 141-1 executes a predetermined function. For example, upon recognizing that an integer stored in memory segment field 192A has been incremented, work session 141-1 reads a file location from memory segment field 192B. The indicated file stores information regarding the function to be initiated by work session 141-1. For example, work session 141-1 may execute or otherwise access the file at the indicated location to display a message to system users such as "System shutdown in one hour."

FIG. 3 shows a flow chart of exemplary setup operation 210 for setting up system 100 in accordance with the invention. During create shared memory segments operation 310, a storage region on a storage device of a server is selected and made available to a management process and various work sessions. For example, a region such as memory segment 124 of storage 122 (e.g., active memory such as random access memory) of NFS server 110 is designated as shared memory segment 192 by master management process 181. Also, a region in the memory of server 130-1 is designated as shared memory segment 192 by compute server management process 182 (or, alternatively, by master management process 181). Generally, a shared memory segment is configured on each of compute servers 130 of system 100. As discussed above, each shared memory region is organized into specific fields of data. In one embodiment, two fields are used: msgFlag 192A and msgFile 192B. The msgFlag field 192A is an integer counter and the msgFile field 192B is file name and/or location that contains a message.

The UNIX system call shmget may be used by to designate shared memory segments such as memory segment 192. The system call shmget is used to create shared memory segment 192 and generate the associated system data structure. Such a system call is known in the art. A size argument of the shmget system call determines the size in bytes of the shared memory segment. A shmflg argument specifies segment creation conditions and access permissions.

If successful, the shared memory segment and the system data structure are identified by a unique shared memory identifier that the system call shmget returns. If the system call shmget fails, a value of −1 is returned and the error flag is set to a particular value to indicate the type of error. The system call shmget does not allow the creating process to actually use shared memory segment 192. Rather, the system call shmget reserves shared memory segment 192. A process must attach shared memory segment 192 by using a separate system call, described hereinafter, prior to using shared memory segment 192.

Control then transitions to attach operation 320. During attach operation 320, the various computer processes which will communicate via the shared memory segment are attached to the memory segment so that those computer processes can each access the shared memory segment. For example, during attach management processes operation 322, each of master management process 181 and compute server management process 182 attach master memory segment 124. Compute server management process 182 (and possibly master management process 181) also attaches compute server memory segment 192. The management processes attach memory segment 192 to control changes to the information stored in memory segment 192. After attach management processes operation 322 and during attach work session processes operation 324, work sessions 141-1, 1411-2 . . . 141-x attach compute server memory segment 192.

The UNIX system call shmat may be used to attach the shared memory segment 192 to the above described processes. The shared memory operation system call shmat attaches (maps) the referenced shared memory segment into the calling process's data segment. For example, the system call:

shmat(shmid *shmaddr shmflg);

attaches the shared memory segment referenced by the shared memory identifier shmid to the data segment of the calling process at an attachment address indicated by *shmaddr. The shared memory access permissions are designated by the command line argument shmflg. If desired, the shmflg may be valued so that the memory segment is read only.

Control then transitions to attach work sessions operation 324. During attach work sessions operation 324, the work sessions which will receive messages via the shared memory segment 192 attach the shared memory segment 192. For example, work sessions 140-1, 141-2 . . . 141-x can attach shared memory segment 192 by issuing system call shmat designating memory segment 192 as described above.

Figure 4:
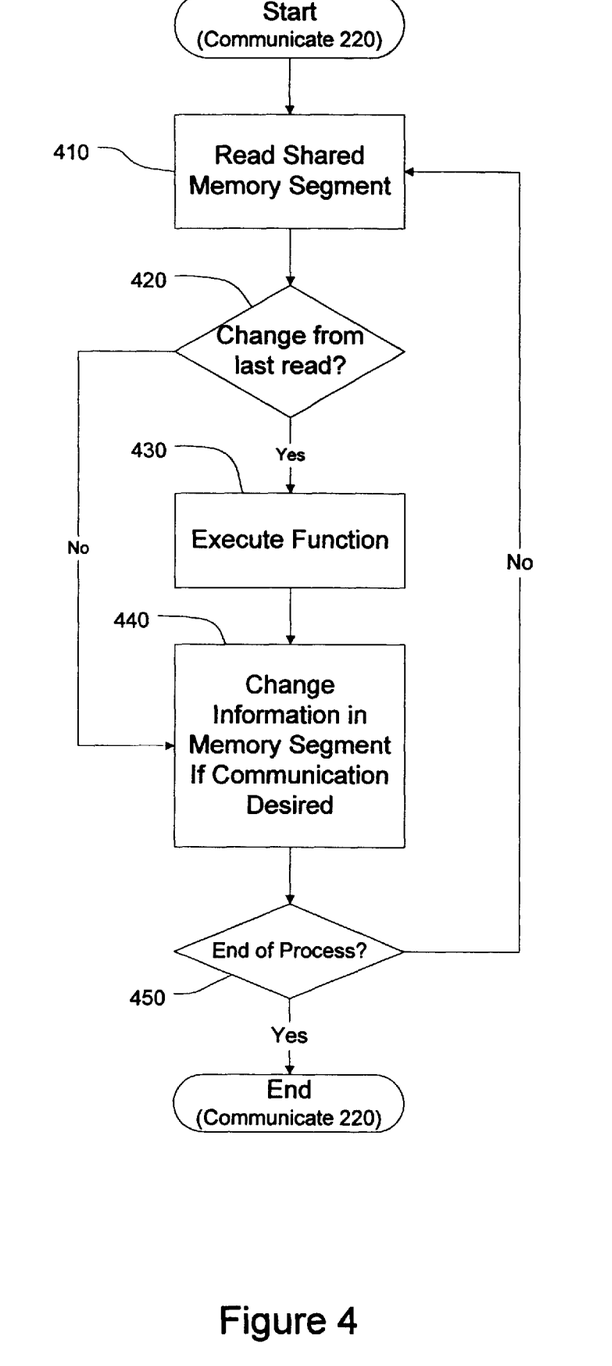
FIG. 4 shows a flow chart of an embodiment of a dynamic execution module and/or operation according to the invention.

Control then transitions to communicate operation 220. FIG. 4 depicts a flow chart of an exemplary communicate operation 220 according to the invention. At read shared memory segment operation 410, each work session 140 reads shared memory segment 192. For example, work session 140-1 reads shared memory segment field 192A which stores an integer value. Each work session reads a shared memory segment upon completion of a WorkStream screen based transaction.

Control then transitions to change decision operation 420. During change decision operation 420, each of work sessions 140 determines if the information read from memory segment 192 has been changed. For example, work session 140-1 determines if the integer read during operation 410 is different from a previously read integer. If work session 140-1 has not previously read an integer value from memory segment 192, then the integer value read during operation 410 is treated as unchanged. If the integer value is unchanged, control transitions to change state 440. If the integer value is changed, control transitions to execute function operation 430.

During execute function operation 430, each work session that senses a change in shared memory segment field 192A executes a predetermined function. For example, if work session 140-1 senses a change in the integer stored in memory segment field 192A, work session 140-1 reads memory segment field 192B to determine the function to be performed. For example, the location of a file to be executed or containing a message to be displayed may be read from memory segment field 192B. An exemplary function is the display of a shutdown message to the user of work session 140-1.

In one embodiment, work sessions 140 are WorkStream work sessions. WorkStream is a screen/forms based application that has an event loop that is iterated after every screen transaction. Therefore, when repetitive checking is required, code can be inserted into this event loop. For this example, the code would check the msgFlag value of memory segment 192 and determine if the msgFlag had been incremented since the last iteration.

management process 181 may also place a system call or a pointer to an executable file in memory segment field 192A.

For example, in order to display a message screen, the shared memory management program would increment the msgFlag value by 1 and deposit the name of a text file into the msgFile field. Exemplary code for this operation in the shared memory management program would be:

```
sm->magFlag++;      /* increment the counter value by 1 and copy
                       the name of the message file into the
                       msgFile field */
strcpy (sm->msgFile, "/usr/local/bin/shutdown.message" );
```

Control then transitions to end decision operation 450. Control transitions from end decision operation 450 to read shared memory segment operation 410 if the work session continues. Otherwise, the execution of the communication operation is terminated. Thus, the work session repeatedly loops through operations 410–450 during the normal functioning of the work session.

In one embodiment, system 100 is brought on line and each of the management processes creates a shared memory segment on each of corresponding servers 110, 130. Work session processes 140 are initiated by terminals 160. A master management process 181 attaches the shared memory segment 124 for the purpose of storing information in memory segment 124 and making such information available to processes controlling access to the other memory segments. In this way, the master management process can communicate a message to compute servers 130 and ultimately to the work sessions executing on compute servers 130. Each of work sessions 140 includes an iterative return program structure which causes the work session to perform certain functions when an I/O event occurs. For

```
if (sm->msgFlag > prev_msgFlag)        /* has msgFlag been incremented? */
{
    display_message (sm->msgFile);     /* if so, then display the message */
    prev_msgFlag=sm->msgFlag;          /* save the value of msgFlag for
                                          the next iteration */
}
```

The result of this operation would be the display of a message box including a message provided in the file identified by msgFile field 192B. Thus, in the present example, read, decision and execute operations 410, 420, 430 are performed by a single "if" command. The above "if" command reads the msgFlag value of memory segment field 192A, determines whether the memory segment value msgFlag has changed from a previously saved version, and displays a message in the file pointed to by msgFile field 192B if the value stored in memory segment field 192A has changed.

If the integer value stored in memory segment 192 is unchanged, control transitions from change decision operation 420 to change state operation 440. Otherwise, control transitions from change decision operation 420 to execute function operation 430 to change state operation 440. During change state operation 440, the computer system storing the shared memory segment enters a state in which the shared memory may be changed. For example, if a message is to be communicated to certain work sessions, compute server management process 182 may increment an integer value stored in memory segment 192. Compute server example, upon a keyboard entry or screen transaction completion, work session 140-1 checks shared memory segment 192 for a change in the information stored there. Thus, the iterative return program structure of each work session causes the work session to repetitively return to a set of functions upon a certain event or events. Such a program structure allows for the repeated (not necessarily periodic) execution of a set of functions, one of which functions being the reading of the information stored in the memory segment by the work session computer process. If the information has been changed, a function is performed such as displaying a message to the work session user. In this way, shared memory with prescribed access controls provides more efficient communication to a large audience over a network including multiple computer systems.

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

For example, in one embodiment, computer systems 110, 120, 130 and 160 operate under control of a UNIX type operating system. For example, compute servers 130 are Hewlett Packard Series 800 computer system running the HP-UX 9.04 type UNIX operating system. Such a computer system may function as a server for client computer systems. Terminals 160 are Xterminals and/or personal computer systems executing software such as Xwindows of PCNFS for managing sessions. It is understood that other computer systems, other UNIX operating systems (e.g., the International Business Machines AIX operating system), and other operating systems (e.g., the Windows NT operating system) may be used in accordance with the invention. Other embodiments may include mainframes, minicomputers, personal computer systems and/or terminals in place of some or all of the computer systems of system 100. Files are accessed by the computer systems of system 100 using the network file server (NFS) protocol. Other appropriate methods of making the files available to computer systems 110, 130, 140 and 160 may be used in accordance with the invention.

The shared memory segment can be defined to include any storage location or region accessible by more than one computer process. The shared memory segment may include any of the various forms of computer register, buffer or cache memory, main memory (typically random access memory) and/or virtual memory. Alternatively or in addition, the shared memory segment may include any writable mass storage device. The shared memory segment may include storage space for one or more bits of information. Each memory segment may be a file. In a UNIX-based embodiment, a file may be a device, a terminals, remote file, a local file, a socket, a network connection, a signal, or other expedient of communication or state change.

The commonly accessible master memory segment 124 and master management process 181 need not be located on NFS server 110 as shown in FIG. 1B. Memory segment 124 and management process 181 may be at any commonly accessible location in system 100. In one embodiment, master memory segment 124 and master management process 181 are located on one of compute servers 130 or a computer system added to system 100. Furthermore, the master management process 181 may communicate directly with compute server management processes 182, 184, 188 instead of storing a value to memory segment 124 to be accessed by each of compute server processes 182, 184, 188.

Each of the blocks of FIGS. 2–4 may be executed by a module (e.g., a software module) or a portion of a module or a computer system user. Thus, the above described communication method, the operations thereof and modules therefor may be executed on a computer system configured to execute the operations of the method and/or may be executed from a computer-readable storage medium. The method may be embodied in a machine-readable or computer-readable storage medium for configuring a computer system to execute the method. A computer-readable storage medium such as storage 122, 191, 193, 197 of servers 110, 130, for example, can include storage devices such as floppy disks, hard drives, optical disks (e.g., CD-ROM, CD-R, etc.), semiconductor-based memory units including FLASH memory, EEPROM, EPROM, ROM or RAM or application specific integrated circuits. Storage 122, 191, 193, 197 and other storage may be permanently, removably or remotely coupled to servers 110, 130 or any other computer system of system 100. Thus, the software modules may be stored within a computer system memory to configure the computer system to perform the functions of the module. Other new and various types of computer-readable storage media may be used to store the software modules discussed herein.

The operations referred to herein may be modules or portions of modules (e.g., software, firmware or hardware modules). For example, although the various modules may include application specific hardware modules, the described embodiment includes software modules and/or includes manually entered user commands. The software modules discussed herein may include script, batch or other executable files, or combinations and/or portions of such files.

Computer systems are used to provide general manufacturing monitoring and control. The invention has been described in the context of system 100. In such a system, each of a plurality of semiconductor manufacturing computer systems provides information, control and/or automation to semiconductor manufacturing tools, systems and/or users in a semiconductor manufacturing facility. Thus, in one embodiment, communication is provided in a computer network which provides information, control and automation of semiconductor manufacturing processes. Other embodiments include other types of distributed computing systems. The distributed computing system need not be a manufacturing control system. Any distributed computing system is especially benefited by the above described communication method and/or module(s).

Although specific examples of computer systems 110, 120, 130, 140, 150 and 160 are shown in FIG. 1 as included within the exemplary system 100, other embodiments of the invention may include an information processing network having any number of computer systems in other appropriate network configuration. Furthermore, the functionality of the various computer systems may differ from the computer systems of exemplary system 100. System 100 may include additional computer systems of different types or combinations, or the functions of several of the servers may be combined into fewer servers.

Also, although the above exemplary description frequently refers to work sessions, other types of application sessions may access the shared memory segments. For example, each of terminals 160 may include a window manager application which may access a shared memory segment to further realize the advantages of the invention.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule. Furthermore, those skilled in the art will recognize that the operations given in the exemplary embodiment are for illustration only. Operations may be combined or the functionality of the operations may be distributed in additional operations in accordance with the invention.

As used herein, communicating with a work session includes communicating with a process of a work session, and actions executed by a process of a work session may be referred to as actions executed by the work session itself. More generally, a parent process may spawn other, child processes to help perform the overall functionality of the parent process. Because the parent process specifically spawns the child processes to perform a portion of the overall functionality of the parent process, the functions performed by child processes (and grandchild processes, etc.) may be described as being performed by the parent process.

Also, the variable identifiers "n" and "x" are used in several instances in FIGS. 1A and 1B to more simply designate the final element (e.g., compute server 130-n, work session 141-x, etc.) of a series of related or similar elements (e.g., compute servers 130, work sessions 140, etc.). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "n" or "x" may hold the same or a different value than other instances of the same variable identifier. For example, compute server 130-n may be the tenth compute server in a series of compute servers, whereas terminal 160-n may be the fiftieth terminal in a series of terminals.

Also, with regard to the above described computer processes, system 100 may include the active computer processes executing during the above described operations. System 100 may include modules for executing the computer processes stored in memory of computer systems of system 100 when system 100 is not fully operational.

The above description is not intended to present an exhaustive list of embodiments of the invention. Although an attempt has been made to outline some exemplary embodiments and exemplary variations thereto, other embodiments and/or variations are within the scope of the invention as defined in the claims below.

What is claimed is:

1. A method of communication in a distributed computing environment, the method comprising:

storing information in a first memory segment on a first computer system in the distributed computing environment;

repeatedly updating a second memory segment of a second computer system coupled to the first computer system, the second memory segment being repeatedly updated with information corresponding to the most recently read information stored in the first memory segment;

repeatedly reading the information stored in the second memory segment by each of a plurality of work session computer processes;

changing the information stored in the first memory segment; and performing a function by each of the plurality of work session computer processes, the function performed by each of the plurality of work session computer processes being determined by a change of the information read from the second memory segment.

2. The method of claim 1, wherein:

the repeatedly updating the second memory segment is performed a first number of times during a first time;

the repeatedly reading the information stored in the second memory segment is performed a second number of times during the first time by each of the plurality of work session computer processes; and the second number of times is greater than the first number of times.

3. The method of claim 1, wherein:

the storing information in the first memory segment includes storing a first integer value in a first field of the first memory segment; and storing a file name in a second field of the first memory segment;

the changing the information stored in the first memory segment includes incrementing the first integer value when the function is to be performed by each of the plurality of work session computer processes; and the function is performed by each of the plurality of work session computer processes if the first value is an integer value incremented from the first integer value.

4. The method of claim 1, wherein:

the information is stored in the first memory segment by a first management computer process executing on the first computer system; and the information stored in the first memory segment is changed by the first management computer process.

5. The method of claim 4, wherein:

the second memory segment is updated by a second management computer process executing on the second computer system.

6. The method of claim 1, wherein:

the function is displaying a message to a work session user.

7. The method of claim 1, wherein the information stored in the memory segment includes:

a first set of information; and a second set of information, the second set of information being accessed to determine the function to be performed by each of the plurality of work session computer processes responsive to a change in the first set of information being sensed by each of the plurality of work session computer processes.

8. The method of claim 7, wherein:

the first set of information includes an integer value; and the second set of information includes a file name of an executable file, the second set of information being accessed responsive to the integer value being changed.

9. The method of claim 8, wherein:

the second set of information is accessed responsive to the integer value being incremented.

10. The method of claim 1, wherein:

the information is stored in the first memory segment by a first management computer process;

the second memory segment is updated by a second management computer process;

the method further includes attaching the first memory segment by the management computer process; and the method further includes attaching the second memory segment by the second management computer process.

11. The method of claim 10, further comprising:

attaching the second memory segment by each of the plurality of work session computer processes before repeatedly reading the information stored in the second memory segment by the work session computer processes.

12. The method of claim 1, wherein each of the work session computer processes is an instance of a semiconductor manufacturing work session, each instance of the semiconductor manufacturing work session having an iterative program structure in which a set of functions are repeatedly executed, one of the set of functions being the repeatedly reading the information stored in the second memory segment.

13. The method of claim 1, wherein the work session computer processes are WorkStream work session computer processes.

14. The method of claim 1, wherein:

the distributed computing environment is a semiconductor manufacturing distributed computing environment including the first and second computer systems, the second computer system being one of a plurality of compute server computer systems of the semiconductor manufacturing distributed computing environment;

the information in the first memory segment is stored by a first management computer process executing on the first computer system; and the second memory segment is repeatedly updated by at least a second management computer process executing on the second computer system.

15. The method of claim 1 further comprising:

initializing the first memory segment before storing information in the first memory segment; and initializing the second memory segment before repeatedly updating the second memory segment.

16. The method of claim 15, wherein:

the initializing the first memory segment includes
  executing a shmget system call by a first management computer process executing on the first computer system; and
  executing a shmat system call by the first management computer process executing on the first computer system.

17. The method of claim 16, wherein:

the initializing the second memory segment includes
  executing a shmget system call on the second computer system by the first management computer process executing from the first computer system; and
  executing a shmat system call on the second computer system by the first management computer process executing from the first computer system.

18. The method of claim 16, wherein:

the initializing the second memory segment includes
  executing a shmget system call by a second management computer process executing on the second computer system; and
  executing a shmat system call by the second management computer process executing on the second computer system.

19. A method of interprocess communication in a WorkStream semiconductor manufacturing distributed computing environment including multiple instances of active WorkStream processes, each WorkStream process executing a programmable screen transaction completion function, the method comprising:

initializing a first memory segment on a first semiconductor manufacturing server in the WorkStream semiconductor manufacturing distributed computing environment;

initializing a second memory segment on a second semiconductor manufacturing server in the WorkStream semiconductor manufacturing distributed computing environment;

attaching the first memory segments by a first management computer process executing on the first semiconductor manufacturing server;

attaching the first and second memory segments by a second management computer process executing on the second semiconductor manufacturing server;

attaching a plurality of WorkStream processes executing on the second semiconductor manufacturing server to the second memory segment;

storing information in the first memory segment with the first management computer process after attaching the first management computer process to the memory segment;

mirroring the information from the first memory segment to the second memory segment by the second management computer process after attaching the second management computer process to the first and second memory segments;

repeatedly reading the information stored in the second memory segment by each of the plurality of WorkStream processes after attaching the plurality of WorkStream processes to the second memory segment; and performing a function with each of the plurality of WorkStream processes if the information read from the second memory segment by each of the WorkStream processes has a first value.

* * * * *